(12) United States Patent
Xing et al.

(10) Patent No.: US 11,724,966 B2
(45) Date of Patent: Aug. 15, 2023

(54) MICROWAVE DIELECTRIC CERAMIC MATERIAL AND PREPARATION METHOD THEREOF

(71) Applicant: University of Electronic Science and Technology of China, Chengdu (CN)

(72) Inventors: MengJiang Xing, Kunming (CN); MingShan Qu, Chengdu (CN); HongYu Yang, Chengdu (CN)

(73) Assignee: UNIVERSITY OF ELECTRONIC SCI. AND TECH. OF CHINA, Chengdu (CN)

( * ) Notice: Subject to any disclaimer, the term of this patent is extended or adjusted under 35 U.S.C. 154(b) by 0 days.

(21) Appl. No.: 17/979,079

(22) Filed: Nov. 2, 2022

(65) Prior Publication Data

US 2023/0135062 A1 May 4, 2023

(30) Foreign Application Priority Data

Nov. 3, 2021 (CN) .......................... 202111292699.X

(51) Int. Cl.
*C04B 35/495* (2006.01)
*C04B 35/626* (2006.01)
(Continued)

(52) U.S. Cl.
CPC ........ *C04B 35/495* (2013.01); *C04B 35/6262* (2013.01); *C04B 35/6264* (2013.01);
(Continued)

(58) Field of Classification Search
CPC .................................................. C04B 35/495
See application file for complete search history.

(56) References Cited

U.S. PATENT DOCUMENTS

2016/0352314 A1 12/2016 Newman
2019/0300378 A1* 10/2019 Hill ...................... C01G 35/006

FOREIGN PATENT DOCUMENTS

CN 101186496 A 5/2008
CN 107117967 A 9/2017
(Continued)

OTHER PUBLICATIONS

University of Electronic Science and Technology of China (Applicant), Originally filed claims (allowed) for CN202111292699.X, Nov. 3, 2021.

(Continued)

*Primary Examiner* — Karl E Group
(74) *Attorney, Agent, or Firm* — Zhigang Ma

(57) ABSTRACT

A temperature-stable modified $NiO$—$Ta_2O_5$-based microwave dielectric ceramic material and a preparation method thereof are provided. Using ion doping modification to form solid solution structure is an important measure to adjust microwave dielectric properties, especially the temperature stability. Based on formation rules of the solid solution, ion replacement methods are designed including $Ni^{2+}$ ions are replaced by $Cu^{2+}$ ions, and $(Ni_{1/3}Ta_{2/3})^{4+}$ composite ions are replaced by $[(Al_{1/2}Nb_{1/2})_y Sn_{1-y}]^{4+}$ composite ions, which considers that cations with similar ionic radii to $Ni^{2+}$ and $Ta^{5+}$ ions can be introduced into the $NiTa_2O_6$ ceramic for doping under the same coordination environment (coordination number=6), and therefore a ceramic material with the $NiTa_2O_6$ solid solution structure can be obtained. The microwave dielectric ceramic material with excellent temperature stability and low loss is finally prepared by adjusting molar contents of each of doped ions, and its microwave dielectric properties are excellent.

3 Claims, 1 Drawing Sheet

(51) Int. Cl.
  *C04B 35/634* (2006.01)
  *C04B 35/638* (2006.01)
  *C04B 35/64* (2006.01)
  *H01B 3/12* (2006.01)
(52) U.S. Cl.
  CPC .. *C04B 35/62655* (2013.01); *C04B 35/62695* (2013.01); *C04B 35/638* (2013.01); *C04B 35/63416* (2013.01); *C04B 35/64* (2013.01); *H01B 3/12* (2013.01); *C04B 2235/3217* (2013.01); *C04B 2235/3255* (2013.01); *C04B 2235/3279* (2013.01); *C04B 2235/3281* (2013.01); *C04B 2235/3293* (2013.01); *C04B 2235/604* (2013.01); *C04B 2235/606* (2013.01); *C04B 2235/6567* (2013.01); *C04B 2235/661* (2013.01)

(56) References Cited

FOREIGN PATENT DOCUMENTS

| | | |
|---|---|---|
| CN | 109467432 A | 3/2019 |
| CN | 109574663 A | 4/2019 |
| JP | 63261609 A * | 10/1988 |

OTHER PUBLICATIONS

CNIPA, Notification to grant patent right for invention in CN202111292699.X, dated May 7, 2022.

* cited by examiner

MICROWAVE DIELECTRIC CERAMIC MATERIAL AND PREPARATION METHOD THEREOF

TECHNICAL FIELD

The disclosure relates to the technical field of electronic ceramics and manufacture thereof, in particular to a temperature-stable modified $NiO-Ta_2O_5$-based microwave dielectric ceramic material and a preparation method thereof.

BACKGROUND

The rapid development of 5th generation mobile communication technology (5G) has put forward strict requirements for the dielectric properties of high-frequency communication electronic components, such as resonators, filters, dielectric antennas and so on. Microwave dielectric ceramics refer to ceramic materials that are used as dielectric materials in microwave frequency band (300 MHz~300 GHz) circuits and play certain functions. Due to their controllable size, excellent microwave dielectric properties and wide applications, the microwave dielectric ceramics have received more and more attention in recent years.

In existing microwave dielectric ceramic materials, nickel tantalate ($NiTa_2O_6$) ceramic is a system with tetragonal structure; it is reported by researchers that microwave dielectric properties of the system at a sintering temperature of 1400~1600° C. are: $\varepsilon_r$=25~27 (i.e., the relative dielectric constant $\varepsilon_r$ is in a range of 25 to 27), Q×f=31200 GHz (i.e., the product of the quality factor Q and the resonant frequency f is 31200 gigahertz), $\tau_f$=26~35 ppm/° C. (i.e., the temperature coefficient of resonant frequency $\tau_f$ is in a range of 26 to 35 parts per million for per Celsius degree). It can be found that when the temperature coefficient of resonant frequency of the $NiTa_2O_6$ ceramic is large, the practical application value is low. Generally, the temperature coefficient of resonant frequency $\tau_f$ in a range of ±10 ppm/° C. is considered that temperature stability of the microwave dielectric ceramic material is good, and the more the temperature coefficient of resonant frequency $\tau_f$ tends to 0 ppm/° C., the better the temperature stability will be.

Although there have been some reports on the $ATa_2O_6$ ceramic, $\tau_f$ values of most of systems such as $ATa_2O_6$ (A=Co, Ni) being too large, for example, the $\tau_f$ value of the system of A=Co is 25 ppm/° C. There are also explorations on using the composite of titanium dioxide ($TiO_2$) and $ATa_2O_6$ (A=Ni/Co/Zn), which also has a large $\tau_f$ value (for example, the $\tau_f$ value of $NiTiTa_2O_8$ is 75 ppm/° C.). Therefore, how to obtain a modified $NiTa_2O_6$-based microwave dielectric ceramic system with temperature stability and low loss becomes an urgent difficulty in the research field.

SUMMARY

In order to solve the problem of poor temperature stability of the current $NiTa_2O_6$ ceramic, the disclosure provides a preparation method for a temperature-stable modified $NiO-Ta_2O_5$-based microwave dielectric ceramic material. The temperature stability of the microwave dielectric ceramic material is improved while the low dielectric loss is maintained, so that the microwave dielectric ceramic material can be widely applied to the field of electronic communication.

The temperature-stable modified $NiO-Ta_2O_5$-based microwave dielectric ceramic material provided by the disclosure, its general chemical formula is expressed as $[(Ni_{1-x}Cu_x)_{1/3}Ta_{2/3}]_{1-z}[(Al_{1/2}Nb_{1/2})_ySn_{1-y}]_zO_2$, where $0.02 \leq x \leq 0.08$, $0.05 \leq y \leq 0.2$, $0.02 \leq z \leq 0.06$. The microwave dielectric ceramic material is prepared by solid-state method. In the range of $0.02 \leq x \leq 0.08$, $0.05 \leq y \leq 0.02$, $0.02 \leq z \leq 0.06$, the microwave dielectric ceramic material only consists of $NiTa_2O_6$ solid solution and its crystal structure is the $NiTa_2O_6$ solid solution.

A sintering temperature of the microwave dielectric ceramic material is in a range of 1325° C. to 1400° C., a relative dielectric constant $\varepsilon_r$ is in a range of 19 to 23, a product of a quality factor Q and a resonant frequency f is in a range of 30000 GHz to 52000 GHz, and a temperature coefficient of resonant frequency is in a range of −5 ppm/° C. to 5 ppm/° C.

In an embodiment, when x=0.05, y=0.15, z=0.02, and the sintering temperature of the microwave dielectric ceramic material is 1375° C., the relative dielectric constant Fr is 20.91, dielectric loss is $2.14 \times 10^{-4}$, the product of the quality factor Q and the resonant frequency f is 50028 GHz, and the temperature coefficient of resonant frequency is −1.7 ppm/° C.

A preparation method for the temperature-stable modified $NiO-Ta_2O_5$-based microwave dielectric ceramic material is provided by the disclosure, and the preparation method includes following steps:

step 1: mixing raw powders of nickel monoxide (NiO), cupric oxide (CuO), aluminum oxide ($Al_2O_3$), niobium pentoxide ($Nb_2O_5$), stannic oxide ($SnO_2$), and tantalum pentoxide ($Ta_2O_5$) according to a general chemical formula expressed as $[(Ni_{1-x}Cu_x)_{1/3}Ta_{2/3}]_{1-z}[(Al_{1/2}Nb_{1/2})_ySn_{1-y}]_zO_2$, where $0.02 \leq x \leq 0.08$, $0.05 \leq y \leq 0.2$, $0.02 \leq z \leq 0.06$;

step 2: putting the mixed raw powders prepared in the step 1 into a ball milling tank, milling media being zirconium balls and deionized water, and performing ball milling according to a mass ratio of the mixed raw powders:the zirconium balls:the deionized water of 1:6~8:4~6 for a duration of the ball milling in a range of 6 hours~8 hours to obtain a first milled material; taking out the first milled material and drying the first milled material in an oven at a temperature in a range of 80° C.~120° C. to obtain a first dried material; sieving the first dried material with a mesh screen with a mesh sieve size in a range of 40~60 mesh; then pre-sintering the sieved material in an atmosphere at a temperature in a range of 1000° C.~1100° C. for a duration in a range of 3 hours~5 hours;

step 3: performing ball milling according to a mass ratio of the pre-sintered material:the zirconium balls:the deionized water is 1:5~7:1~3 for a duration in a range of 3 hours~6 hours to obtain a second milled material; taking out the second milled material and drying the second milled material to obtain a second dried material; then adding a polyvinyl alcohol solution into the second dried material for granulation, thereby obtaining a granulated material; and step 4: pressing and molding the granulated material prepared in the step 3 to obtain a molded material, performing a debinding process on the molded material at a temperature in a range of 600° C.~650° C., and sintering the molded material after the debinding process in an atmosphere at a temperature in a range of 1325° C.~1400° C. for a duration in a range of 4 hours~6 hours; thereby obtaining a $[(Ni_{1-x}Cu_x)_{1/3}Ta_{2/3}]_{1-z}[(Al_{1/2}Nb_{1/2})_ySn_{1-y}]_zO_2$ microwave dielectric ceramic material as the temperature-stable modified $NiO-Ta_2O_5$-based microwave dielectric ceramic material.

According to the report of existing technology in the industry, using ion doping modification to form solid solution structure is an important measure to adjust the microwave dielectric properties, especially the temperature stability. Based on formation rules of the solid solution, in the disclosure, the ion replacement method is designed including $Ni^{2+}$ ions are replaced by $Cu^{2+}$ ions, and $(Ni_{1/3}Ta_{2/3})^{4+}$ composite ions are replaced by $[(Al_{1/2}Nb_{1/2})_ySn_{1-y}]^{4+}$ composite ions, which considers that cations with similar ionic radii to $Ni^{2+}$ and $Ta^{5+}$ ions can be introduced into the $NiTa_2O_6$ ceramic for doping under the same coordination environment (coordination number=6); and thus a ceramic material with the $NiTa_2O_6$ solid solution structure can be obtained. The microwave dielectric ceramic material with excellent temperature stability and low loss is finally prepared by adjusting molar contents of each of doped ions, and its microwave dielectric properties are excellent.

DETAILED DESCRIPTION OF EMBODIMENTS

The disclosure is further described in detail below in combination with attached drawings and embodiments.

Step 1, raw powders of NiO, CuO, $Al_2O_3$, $Nb_2O_5$, $SnO_2$, and $Ta_2O_5$ are mixed with mole ratios according to a general chemical formula expressed as $[(Ni_{1-x}Cu_x)_{1/3}Ta_{2/3}]_{1-z}[(Al_{1/2}Nb_{1/2})_ySn_{1-y}]_zO_2$, where x=0.05, y=0.15, z=0.02, 0.04, 0.06.

Step 2, the mixed raw powders prepared in the step 1 are put into a ball milling tank, milling media are zirconium balls and deionized water, and first planetary ball milling is performed according to a mass ratio of the mixed raw powders:the zirconium balls:the deionized water of 1:6:4 for 6 hours to obtain a first milled material. The first milled material is taken out and the first milled material is dried in an oven at a temperature of 100° C. to obtain a first dried material. The dried material is sieved by a 60-mesh screen, and then the sieved material is pre-sintered in an atmosphere at a temperature of 1100° C. for 3 hours.

Step 3, the pre-sintered material is added into the ball milling tank to perform second planetary ball milling according to a mass ratio of the pre-sintered material:the zirconium balls:the deionized water of 1:6:3 for 4 hours to obtain a second milled material. The second milled material is taken out and the second milled material is dried to obtain a second dried material. Then, a polyvinyl alcohol solution is added into the second dried material for granulation, thereby a granulated material is obtained.

Step 4, the granulated material obtained in the step 3 is put into a mould with a diameter of 12 mm (Φ12), and a molded material is formed by dry-pressing under pressure of 20 megapascals (MPa). Therefore, a cylindrical block with a size of 12 mm×6 mm can be obtained. Then, the cylindrical block is kept at a temperature of 650° C. for 2 hours to remove ceramic binders (also referred to a debinding process), then the temperature is raised to 1325° C.~1400° C. and the temperature is kept for 4 hours to finally obtain a microwave dielectric ceramic material having the general chemical formula expressed as $[(Ni_{1-x}Cu_x)_{1/3}Ta_{2/3}]_{1-z}[(Al_{1/2}Nb_{1/2})_ySn_{1-y}]_zO_2$ (also referred to the modified NiO—$Ta_2O_5$-based microwave dielectric ceramic material with stable temperature).

Figure 1:
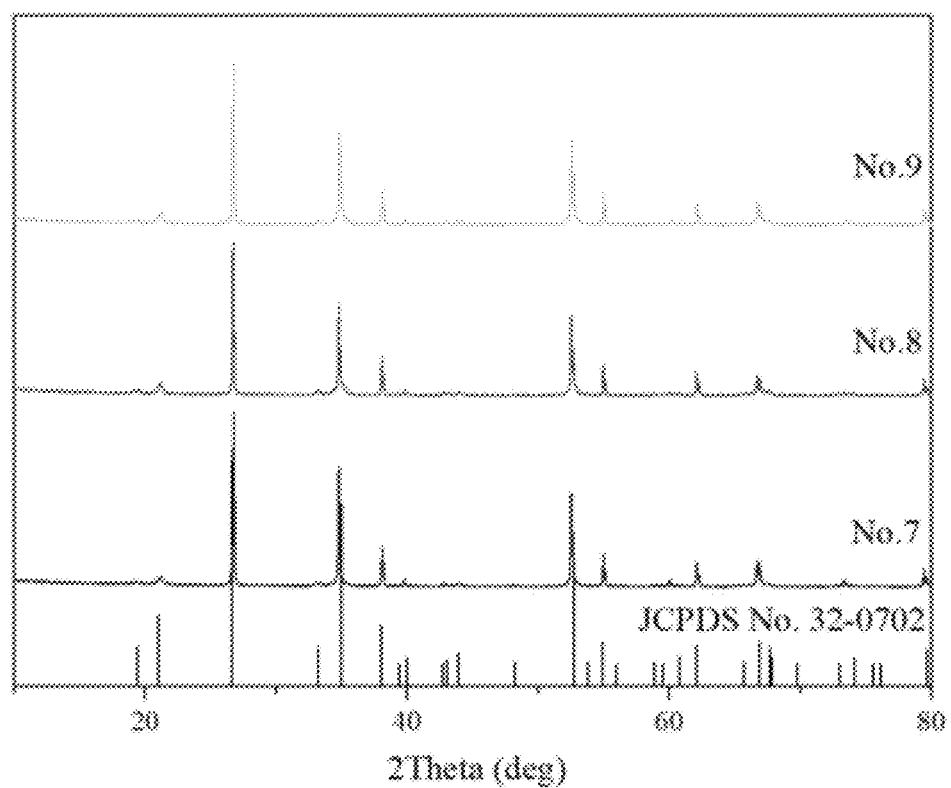
FIG. 1 shows X-ray diffraction (XRD) patterns of ceramic samples corresponding to embodiments 7, 8, and 9.

12 ceramic samples corresponding to 12 embodiments are made according to the above steps. FIG. 1 shows XRD patterns of ceramic samples corresponding to embodiments 7, 8, and 9. It can be found that phase compositions of the ceramic samples of the three different embodiments correspond to Joint Committee Powder Diffraction Standards (JCPDS) card No. 32-0702 which is a standard card of $NiTa_2O_6$ by retrieval. Doping ions are solid dissolved to the cationic lattices and no diffraction peak of second phase is found, which indicates that the $[(Ni_{1-x}Cu_x)_{1/3}Ta_{2/3}]_{1-z}[(Al_{1/2}Nb_{1/2})_ySn_{1-y}]_zO_2$ ceramic belongs to the solid solution of $NiTa_2O_6$ structure.

Figure 2:
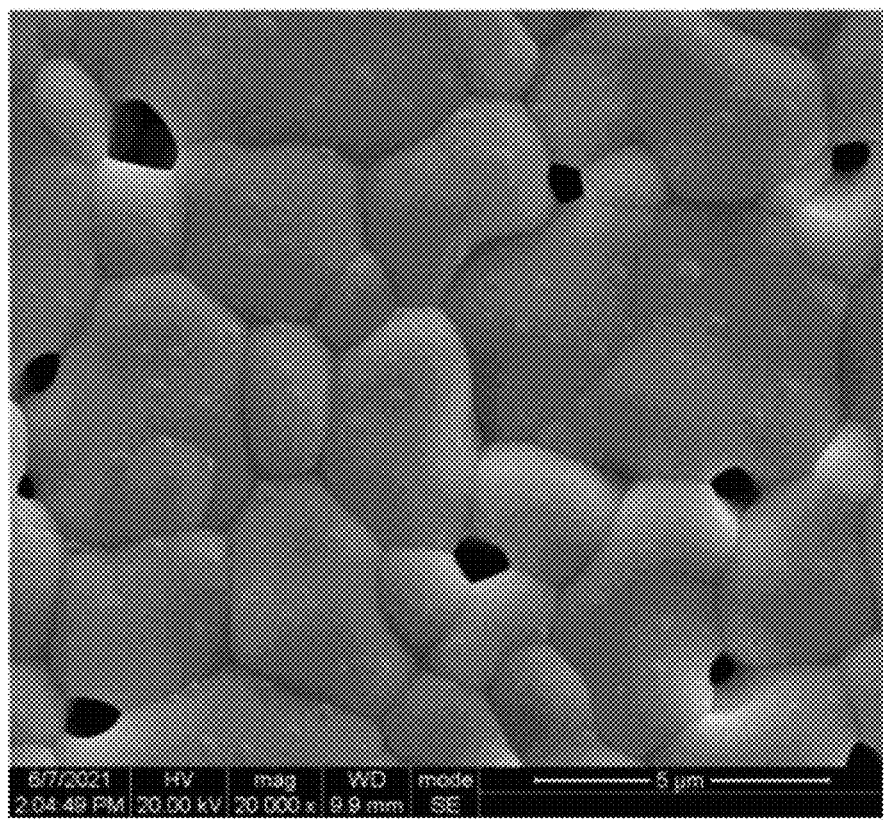
FIG. 2 shows a morphology diagram of the ceramic sample corresponding to the embodiment 7 under a scanning electron microscope (SEM).

FIG. 2 shows a morphology diagram microscope of SEM corresponding to embodiment 7; it can be seen that the crystalline grain growth of the ceramic sample of the embodiment 7 is sufficient, and the grain boundaries are clearly visible, indicating that there is no over-burning phenomenon, but there are still some micro-pores in the ceramic sample.

Specific components and microwave dielectric properties of the ceramic samples in various embodiments (i.e., the following 12 embodiments) are as follows.

TABLE 1

Specific components of ceramic samples in various embodiments

| Number of embodiments | Mass of each component/g | | | | | | Sintering temperature (° C.) |
|---|---|---|---|---|---|---|---|
| | NiO | CuO | $Ta_2O_5$ | $Al_2O_3$ | $Nb_2O_5$ | $SnO_2$ | |
| 1 | 13.487 | 0.756 | 83.990 | 0.044 | 0.232 | 1.491 | 1325 |
| 2 | 13.243 | 0.742 | 82.472 | 0.089 | 0.465 | 2.989 | |
| 3 | 12.998 | 0.729 | 80.946 | 0.134 | 0.699 | 4.493 | |
| 4 | 13.487 | 0.756 | 83.990 | 0.044 | 0.232 | 1.491 | 1350 |
| 5 | 13.243 | 0.742 | 82.472 | 0.089 | 0.465 | 2.989 | |
| 6 | 12.998 | 0.729 | 80.946 | 0.134 | 0.699 | 4.493 | |
| 7 | 13.487 | 0.756 | 83.990 | 0.044 | 0.232 | 1.491 | 1375 |
| 8 | 13.243 | 0.742 | 82.472 | 0.089 | 0.465 | 2.989 | |
| 9 | 12.998 | 0.729 | 80.946 | 0.134 | 0.699 | 4.493 | |
| 10 | 13.487 | 0.756 | 83.990 | 0.044 | 0.232 | 1.491 | 1400 |
| 11 | 13.243 | 0.742 | 82.472 | 0.089 | 0.465 | 2.989 | |
| 12 | 12.998 | 0.729 | 80.946 | 0.134 | 0.699 | 4.493 | |

TABLE 2

Microwave dielectric properties of ceramic samples in various embodiments

| Number of embodiments | External diameter (mm) | Thickness (mm) | Relative dielectric constant $\epsilon_r$ | Tanδ ($10^{-4}$) | Q × f (GHz) | $\tau_f$ (ppm/° C.) |
|---|---|---|---|---|---|---|
| 1 | 10.89 | 3.89 | 19.41 | 2.87 | 36879 | −3.1 |
| 2 | 10.42 | 4.35 | 21.62 | 2.81 | 34100 | −2.2 |
| 3 | 10.43 | 4.57 | 21.45 | 2.88 | 32673 | −0.9 |
| 4 | 10.76 | 4.3 | 20.53 | 2.52 | 40225 | −1.4 |
| 5 | 10.44 | 4.39 | 22.01 | 2.71 | 35230 | −1.8 |
| 6 | 10.44 | 4.48 | 21.43 | 2.8 | 33623 | 1.2 |
| 7 | 10.61 | 3.65 | 20.91 | 2.14 | 50028 | −1.7 |
| 8 | 10.44 | 4.48 | 21.42 | 2.62 | 36264 | −1.2 |
| 9 | 10.47 | 4.55 | 21.03 | 2.6 | 36356 | 1 |
| 10 | 10.63 | 4.16 | 20.74 | 2.34 | 42828 | −0.8 |
| 11 | 10.43 | 4.49 | 21.89 | 2.83 | 33065 | −1.3 |
| 12 | 10.5 | 4.57 | 20.42 | 2.84 | 33600 | 1.7 |

According to the data provided in TABLE 1 and TABLE 2, when x=0.05, y=0.15 and z=0.02, 0.04, 0.06; the sintering temperature is in a range of 1325° C.~1400° C., and the temperature coefficient of resonant frequency $\tau_f$ is in a range −5 ppm/° C. to 5 ppm/° C., which indicates that these microwave dielectric properties are excellent. In particular, when z=0.02 and a corresponding sintering temperature is 1375° C., (i.e., embodiment 7), the microwave dielectric properties of the ceramic sample (i.e., the temperature-stable modified NiO—Ta$_2$O$_5$-based microwave dielectric ceramic material) are the best: $\varepsilon_r$=20.91, tan $\delta$=2.14×10$^{-4}$, Q×f=50028 GHz, $\tau_f$=−1.7 ppm/° C., which can be widely used in electronic components of high-frequency communication.

What is claimed is:

1. A temperature-stable modified NiO—Ta$_2$O$_5$-based microwave dielectric ceramic material, wherein a general chemical formula of the temperature-stable modified NiO—Ta$_2$O$_5$-based microwave dielectric ceramic material is expressed as [(Ni$_{1-x}$Cu$_x$)$_{1/3}$Ta$_{2/3}$]$_{1-z}$[(Al$_{1/2}$Nb$_{1/2}$)$_y$Sn$_{1-y}$]$_z$O$_2$, where 0.02≤x≤0.08, 0.05≤y≤0.2, 0.02≤z≤0.06; the temperature-stable modified NiO—Ta$_2$O$_5$-based microwave dielectric ceramic material is prepared by a solid-state method; under a condition of 0.02≤x≤0.08, 0.05≤y≤0.2, and 0.02≤z≤0.06, the temperature-stable modified NiO—Ta$_2$O$_5$-based microwave dielectric ceramic material has a single phase of NiTa$_2$O$_6$ solid solution and has a crystal structure of the NiTa$_2$O$_6$ solid solution; and wherein a sintering temperature of the temperature-stable modified NiO—Ta$_2$O$_5$-based microwave dielectric ceramic material is in a range of 1325° C. to 1400° C., a relative dielectric constant $\varepsilon_r$ is in a range of 19 to 23, a product of a quality factor Q and a resonant frequency f is in a range of 30000 gigahertz (GHz) to 52000 GHz, and a temperature coefficient of resonant frequency $\tau_f$ is in a range of −5 parts per million for per Celsius degree (ppm/° C.) to 5 ppm/° C.

2. The temperature-stable modified NiO—Ta$_2$O$_5$-based microwave dielectric ceramic material according to claim 1, wherein when x=0.05, y=0.15, z=0.02, and the sintering temperature of the temperature-stable modified NiO—Ta$_2$O$_5$-based microwave dielectric ceramic material is 1375° C., the relative dielectric constant $\varepsilon_r$ is 20.91, a dielectric loss is 2.14×10$^{-4}$, the product of the quality factor Q and the resonant frequency f is 50028 GHz, and the temperature coefficient of resonant frequency $\tau_f$ is −1.7 ppm/° C.

3. A preparation method for a temperature-stable modified NiO—Ta$_2$O$_5$-based microwave dielectric ceramic material, comprising:

step 1: mixing raw powders of nickel monoxide (NiO), cupric oxide (CuO), aluminum oxide (Al$_2$O$_3$), niobium pentoxide (Nb$_2$O$_5$), stannic oxide (SnO$_2$), and tantalum pentoxide (Ta$_2$O$_5$) according to a general chemical formula expressed as [(Ni$_{1-x}$Cu$_x$)$_{1/3}$Ta$_{2/3}$]$_{1-z}$[(Al$_{1/2}$Nb$_{1/2}$)$_y$Sn$_{1-y}$]$_z$O$_2$, where 0.02≤x≤0.08, 0.05≤y≤0.2, 0.02≤z≤0.06;

step 2: putting the mixed raw powders prepared in the step 1 into a ball milling tank, milling media being zirconium balls and deionized water, and performing ball milling according to a mass ratio of the mixed raw powders:the zirconium balls:the deionized water of 1:6~8:4~6 for a duration in a range of 6 hours~8 hours to obtain a first milled material; taking out the first milled material and drying the first milled material in an oven at a temperature in a range of 80° C.~120° C. to obtain a first dried material; sieving the first dried material with a mesh screen with a mesh sieve size in a range of 40~60 mesh; then pre-sintering the sieved material in an atmosphere at a temperature in a range of 1000° C.~1100° C. for a duration in a range of 3 hours~5 hours;

step 3: performing ball milling according to a mass ratio of the pre-sintered material:zirconium balls:deionized water of 1:5~7:1~3 for a duration in a range of 3 hours~6 hours to obtain a second milled material; taking out the second milled material and drying the second milled material to obtain a second dried material; then adding a polyvinyl alcohol solution into the second dried material for granulation, thereby obtaining a granulated material; and step 4: pressing and molding the granulated material prepared in the step 3 to obtain a molded material, performing a debinding process on the molded material at a temperature in a range of 600° C.~650° C., and sintering the molded material after the debinding process in an atmosphere at a temperature in a range of 1325° C.~1400° C. for a duration in a range of 4 hours~6 hours; thereby obtaining a [(Ni$_{1-x}$Cu$_x$)$_{1/3}$Ta$_{2/3}$]$_{1-z}$[(Al$_{1/2}$Nb$_{1/2}$)$_y$Sn$_{1-y}$]$_z$O$_2$ microwave dielectric ceramic material as the temperature-stable modified NiO—Ta$_2$O$_5$-based microwave dielectric ceramic material.

* * * * *